(12) United States Patent
Short et al.

(10) Patent No.: US 8,438,949 B2
(45) Date of Patent: May 14, 2013

(54) SEALED ROTATOR SHAFT FOR BORESCOPIC INSPECTION

(75) Inventors: Keith E. Short, Rockford, IL (US); Jeff A. Brown, Cherry Valley, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 75 days.

(21) Appl. No.: 12/848,243

(22) Filed: Aug. 2, 2010

(65) Prior Publication Data

US 2012/0026491 A1 Feb. 2, 2012

(51) Int. Cl.
*F04D 25/02* (2006.01)

(52) U.S. Cl.
USPC ............... 74/665 G; 74/11; 74/15.2; 74/625; 415/124

(58) Field of Classification Search .............. 74/625, 74/665 G–665 GD, 11, 15.2; 415/124, 201
See application file for complete search history.

(56) References Cited

U.S. PATENT DOCUMENTS

| | | | |
|---|---|---|---|
| 3,992,991 A * | 11/1976 | Koch | ............................ 101/132 |
| 4,078,864 A | 3/1978 | Howell | |
| 5,653,581 A | 8/1997 | Dixon et al. | |
| 5,709,530 A | 1/1998 | Cahill et al. | |
| 5,813,829 A * | 9/1998 | Mazzotta | ..................... 415/123 |
| 5,839,878 A | 11/1998 | Maier | |
| 6,164,904 A | 12/2000 | Abriles et al. | |
| 6,382,909 B1 | 5/2002 | Voorhees | |
| 6,585,479 B2 | 7/2003 | Torrance | |
| 6,607,355 B2 | 8/2003 | Cunha et al. | |
| 6,683,641 B1 | 1/2004 | MacCracken et al. | |
| 7,061,607 B2 | 6/2006 | Barkhoudarian et al. | |
| 7,458,768 B2 | 12/2008 | Dube et al. | |
| 7,685,826 B2 * | 3/2010 | McCooey et al. | ............... 60/772 |

FOREIGN PATENT DOCUMENTS

| EP | 1795713 A1 | 6/2007 |
|---|---|---|
| GB | 2467202 A | 7/2010 |

OTHER PUBLICATIONS

European Search Report dated Apr. 26, 2012.

* cited by examiner

*Primary Examiner* — William C Joyce
(74) *Attorney, Agent, or Firm* — Carlson, Gaskey & Olds, PC

(57) ABSTRACT

A rotator drive connection for a gas turbine engine accessory box has a shaft connected to be driven by a main shaft in a gas turbine engine through a gear train. A first drive connection allows selective drive of the shaft. A biased drive member includes a second drive connection selectively brought into contact with the first drive connection to allow rotation of the main shaft. The biased drive member biases the second drive connection out of contact with the first drive connection. A gas turbine engine accessory box and a method of borescopic inspection are also disclosed and claimed.

13 Claims, 5 Drawing Sheets

SEALED ROTATOR SHAFT FOR BORESCOPIC INSPECTION

BACKGROUND

This application relates to a sealed rotator shaft for use in borescopic inspection.

Gas turbine engines are known, and typically include a compressor section compressing air and delivering the compressed air into a combustion section. The compressed air is mixed with fuel and combusted, and products of this combustion pass downstream over turbine rotors. The turbine rotors are driven to rotate, and in turn rotate rotors in the compressor section.

One method of inspecting a gas turbine engine is called borescopic inspection. With borescopic inspection, probes are inserted through holes in the sections in a gas turbine engine. For certain aspects of the inspection, the turbine and compressor rotors must be rotated. Thus, it is known to have a rotator shaft associated with a gas turbine engine.

In the existing art, the rotator shaft has typically been part of an accessory drive gearbox. A sealed cover is aligned with an accessory shaft. The accessory shaft is connected through a gear train back to a main engine shaft connecting the turbine rotors and the compressor rotors. When borescopic inspection is to occur, the cover is removed, and a technician will insert a tool that engages the accessory shaft to rotate the turbine rotors. In the past, inspectors have sometimes neglected to replace the cover after the inspection is complete. This is undesirable, as the oil may drain out of an accessory gear case once the engine is returned to operation.

SUMMARY

A rotator drive connection for a gas turbine engine accessory box has a shaft connected to and driven by a main shaft in a gas turbine engine through a gear train. A first drive connection allows selective drive of the shaft. A biased drive member includes a second drive connection selectively brought into contact with the first drive connection to allow rotation of the main shaft. The biased drive member biases the second drive connection out of contact with the first drive connection. A gas turbine engine accessory box and a method of borescopic inspection are also disclosed and claimed.

These and other features of the present invention can be best understood from the following specification and drawings, the following of which is a brief description.

DETAILED DESCRIPTION

Figure 1:
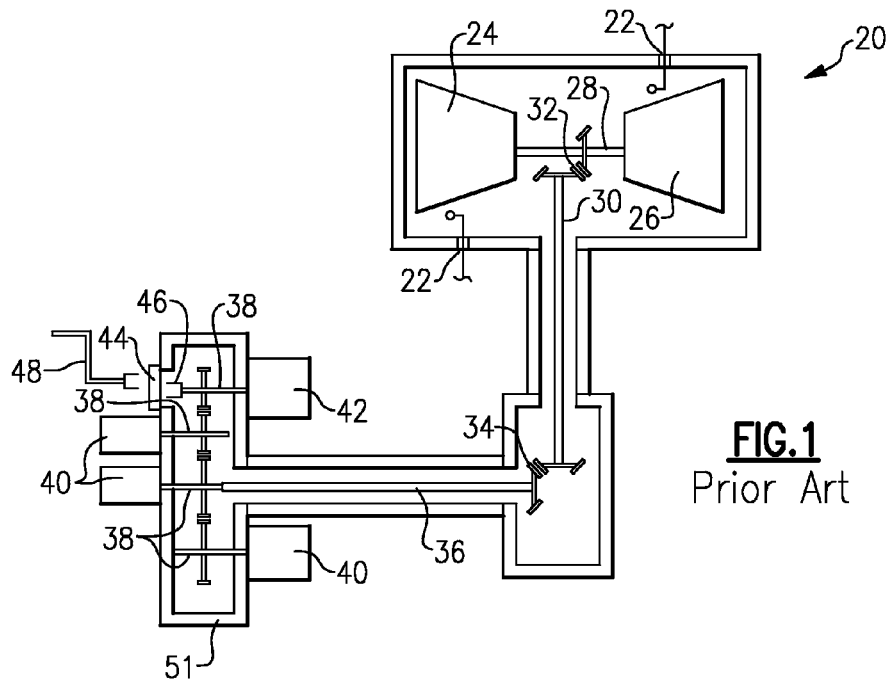
FIG. 1 schematically shows a prior art engine.

FIG. 1 shows a gas turbine engine 20 incorporating borescopic probes 22. As known, the probes 22 extend through inspection openings in a housing or casing for the engine 20. The probes are shown schematically in this Figure. A compressor rotor section 24 is connected to a turbine rotor section 26 by a shaft 28. During operation of the gas turbine engine 20, the turbine rotors 26 are driven to rotate, and rotate the compressor rotors 24 through the shaft 28.

As shown, a gear interface 32 drives an accessory drive gear train shaft 30. The gear train shaft 30 is connected through another gear interface 34 to drive a shaft 36. Shaft 36 drives a plurality of accessory drive shafts 38. Each of the accessory drive shafts 38 is connected to drive an accessory 40. One of the accessory drive shafts 38, which is operable to drive an accessory 42, is provided with a borescopic rotator drive connection 46. A cover 44 selectively encloses an accessory gear box 51, such that oil can be maintained within the gear box 51 during operation of the engine. However, cover 44 must be removed for rotator tool 48 to be brought into the gear connection 46 during borescopic inspection. Tool 48 is then utilized to slowly rotate the drive shaft 28, and hence the rotors 26 and 24. As mentioned above, with this embodiment, it has sometimes been the case that the cover 44 was not returned after completion of inspection.

Figure 2:
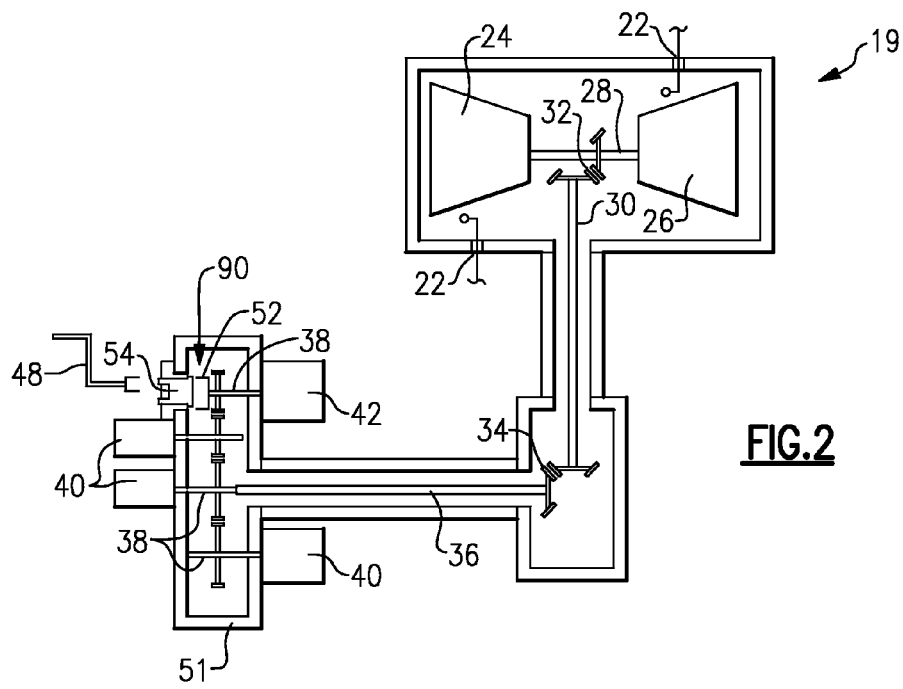
FIG. 2 shows a first inventive schematic.

FIG. 2 shows an embodiment 19 according to aspects of the invention. In embodiment 19, the engine is almost identical to FIG. 1. However, the drive connection 46 on the accessory shaft 38 is provided with a unique rotator drive 90. Together, a biased drive member 54 and first drive connection 52 form rotator drive 90. As will be explained below, the biased drive member 54 is biased to a position removed from the first drive connection 52, and is sealed within the housing 51.

The rotator tool 48 can be brought into contact with the biased drive member 54 which is then forced against a bias force into engagement with the first drive connection 52. At that time, rotation of the drive shaft 28 and rotors 24 and 26 can occur.

Figure 3:
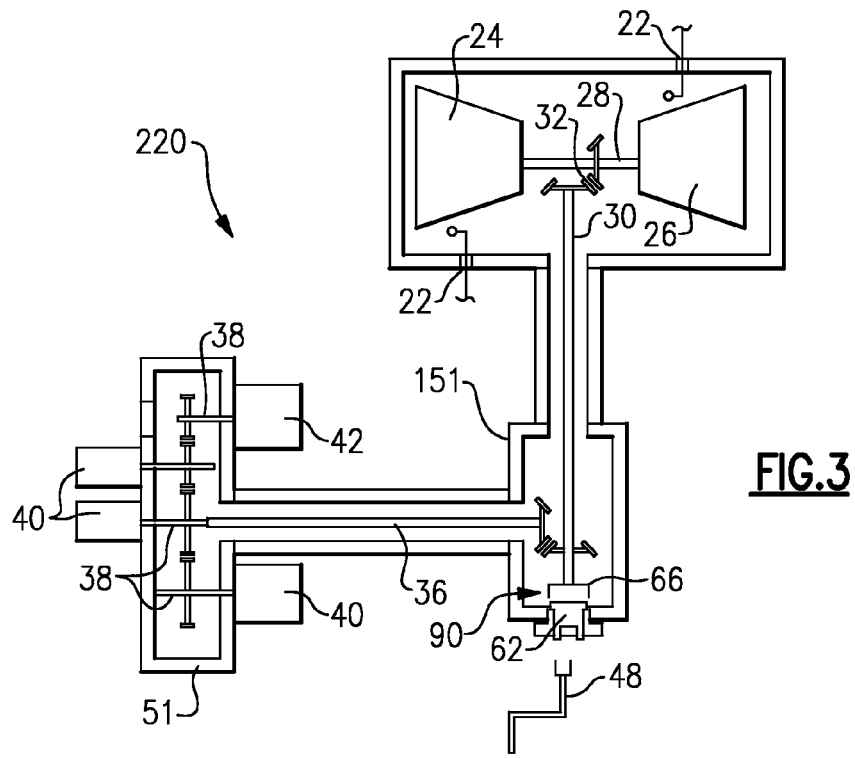
FIG. 3 shows a second embodiment inventive schematic.

FIG. 3 shows another embodiment 220, which is similar to the FIG. 2 embodiment, other than the fact that the rotator drive 90 has a biased drive member 62 and first drive connection 66 associated with a lower housing 151. Utilizing this location allows removal of the biased drive member 62, for disassembly of the gear train shaft 30. The gear train shaft 30 is an "accessory shaft" in that it is part of the gear drive for driving the accessories. For purposes of the claims in this application, the shaft 30 is thus "an accessory shaft."

Figure 9:
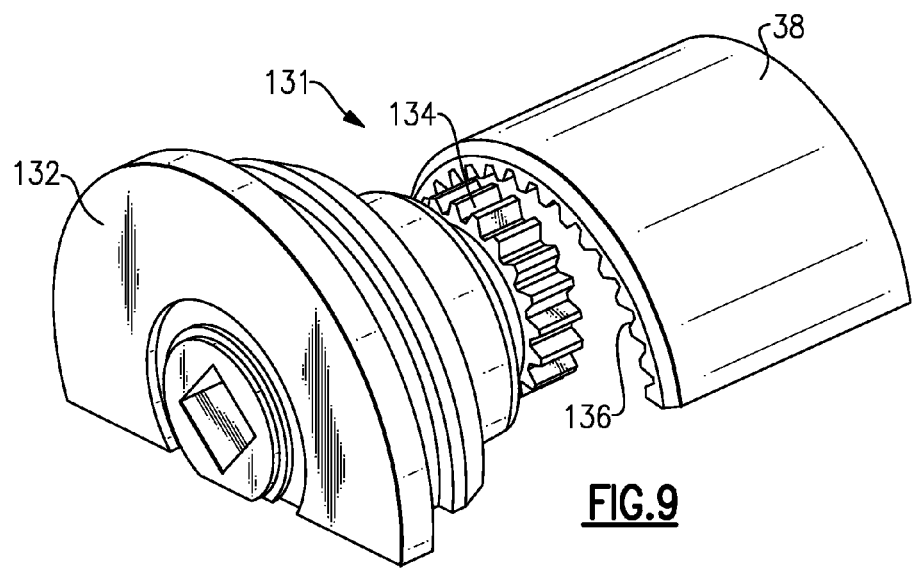
FIG. 9 shows yet another embodiment.
Figure 10:
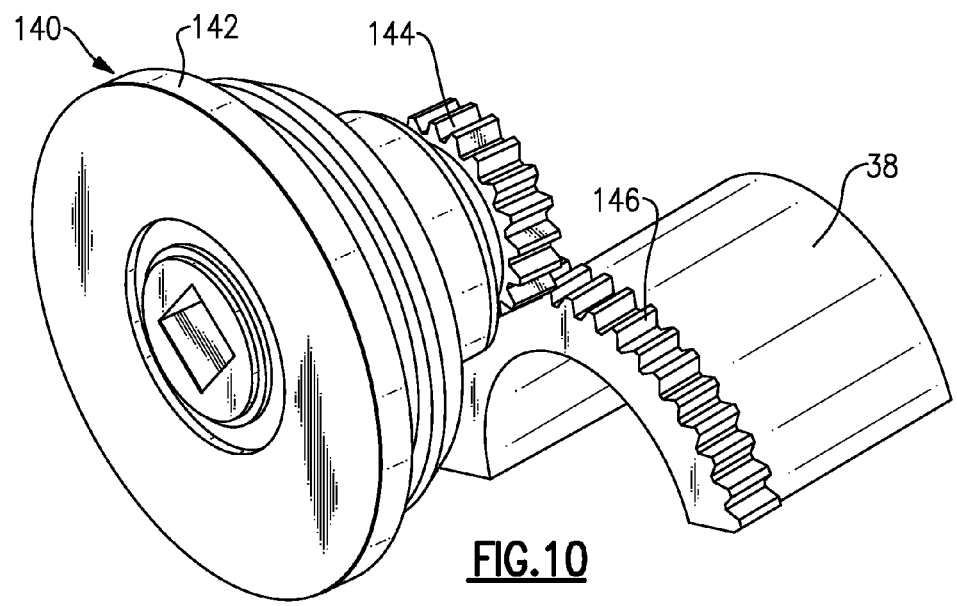
FIG. 10 shows yet another embodiment.

There will be several embodiments disclosed below for the biased drive members 54 or 62. Any one of these embodiments can be utilized in either the FIG. 2 or FIG. 3 application, as well as any number of other locations. For example, although FIGS. 5, 9, and 10 depict accessory shaft 38 and first drive connection 52, these elements can be substituted by gear train shaft 30 and first drive connection 66 in accordance with embodiment 220 of FIG. 3.

Figure 4:
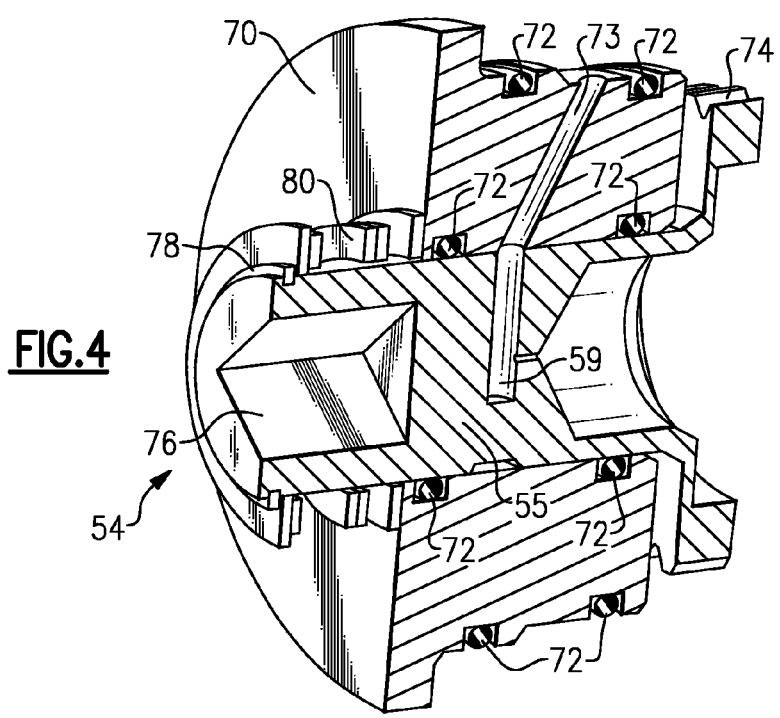
FIG. 4 shows a first embodiment rotator shaft.

FIG. 4 shows the biased drive member 54 having a main shaft 55. Main shaft 55 is movable within a housing 70. A second drive connection 74 in the form of gear teeth at an inner end selectively engage with the first drive connection 52.

Seals 72 are received in grooves in an outer periphery of the housing 70. Intermediate lube passages 73 and 59 can supply lubrication to the shaft 55. A plug surface 76 can selectively receive a drive portion of the rotator tool 48. A clip 78 provides a stop for a spring washer 80, which biases the shaft 55 outwardly of the housing 70. The second drive connection 74 may hit an inner surface of the housing 70 to provide a stop surface. Thus, when the borescopic inspection is not ongoing, the shaft 55 is in a position like that shown in FIG. 4, and the seals 72 prevent leakage of lubricant.

Figure 5:
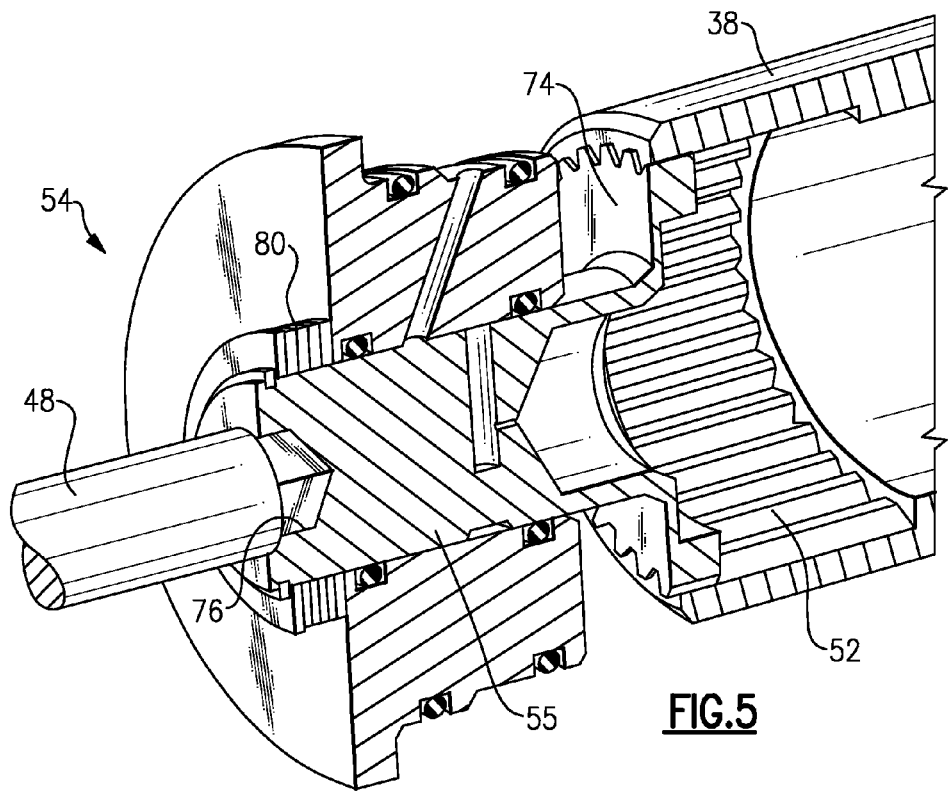
FIG. 5 shows the first embodiment rotator shaft engaged to drive the engine shaft.

FIG. 5 shows the engagement of the rotator tool 48. The rotator tool 48 is brought into engagement and the shaft 55 is forced inwardly against the force of the spring 80. In this manner, the second drive connection 74 is brought into engagement with a first drive connection 52 on the accessory shaft 38. To facilitate this connection, the teeth may be provided with a bow front cross-section.

Figure 6:
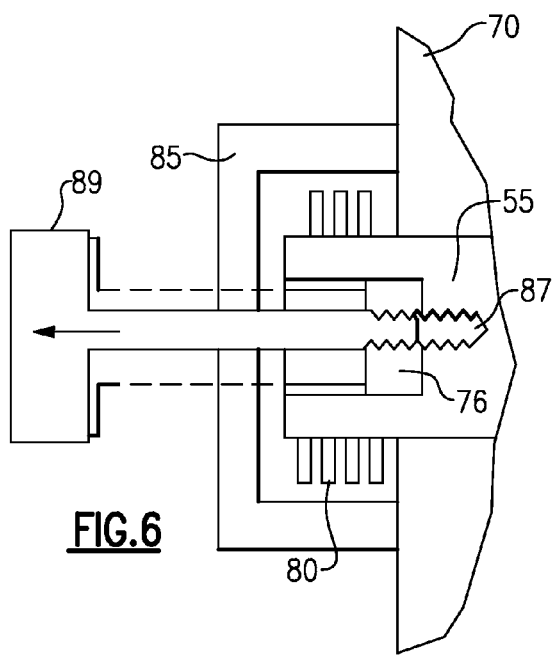
FIG. 6 shows some optional features.

FIG. 6 shows other features which can optionally be incorporated into any one of the embodiments in this application. First, a dust guard 85 can be positioned over the shaft 55 when borescopic operation is not ongoing. The dust guard 85 is optional, and the removal of the dust guard 85 will not result in any oil leaking outwardly of the interior of the gear box 51, or lower housing 151. Rather, the main purpose of dust guard 85 is to keep the area of the spring 80, and the outer face of the shaft 55 relatively clean.

A second feature is shown forward of the plug surface 76. Threads 87 can be provided for use of a pull or retractor tool 89. Should the second drive connection 74 lock into the first drive connection 52, it may sometimes be helpful to thread the retractor tool 89 onto the threads 87, and then pull the shaft 55 outwardly.

Figure 7:
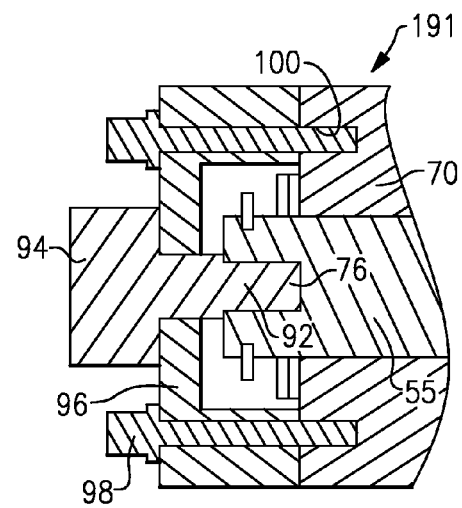
FIG. 7 shows other optional features.

FIG. 7 shows another embodiment 191. In embodiment 191, a plurality of bolt holes 100 are provided in the housing 70. This provides a mounting surface for the use of an automated rotator 94, shown schematically. The bolt holes 100 provide mounting holes to receive bolts 98 securing a rotator housing 96 to housing 70. Automated rotator 94 has a drive 92 that extends inwardly into the plug surface 76. Automated rotator tools are known, and have been utilized with arrangements such as shown in FIG. 1. However, the embodiments of this application would also extend to the use of such an automated tool.

Figure 8A:
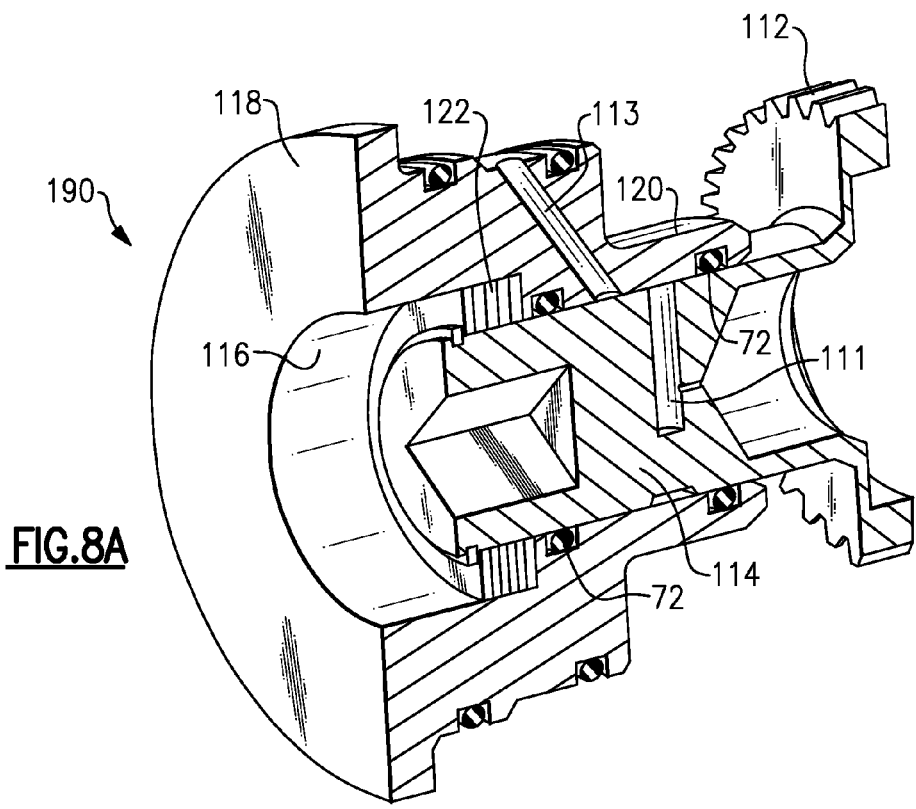
FIG. 8A shows a second embodiment in a first position.

FIG. 8A shows another embodiment 190. Embodiment 190 is particularly useful when housing space is at a premium. Embodiment 190 has the shaft 114, lube passages 111 and 113, and seals 72. The gear teeth 112 function as the second drive connection. The housing 118 has a bore 116, and there is a spring connection 122 as in the earlier embodiment. The 8A position is the engaged position. However, due to the size of forward boss 120 on the housing 118, even in the retracted position, the shaft 114 does not extend outwardly of the housing 118.

Figure 8B:
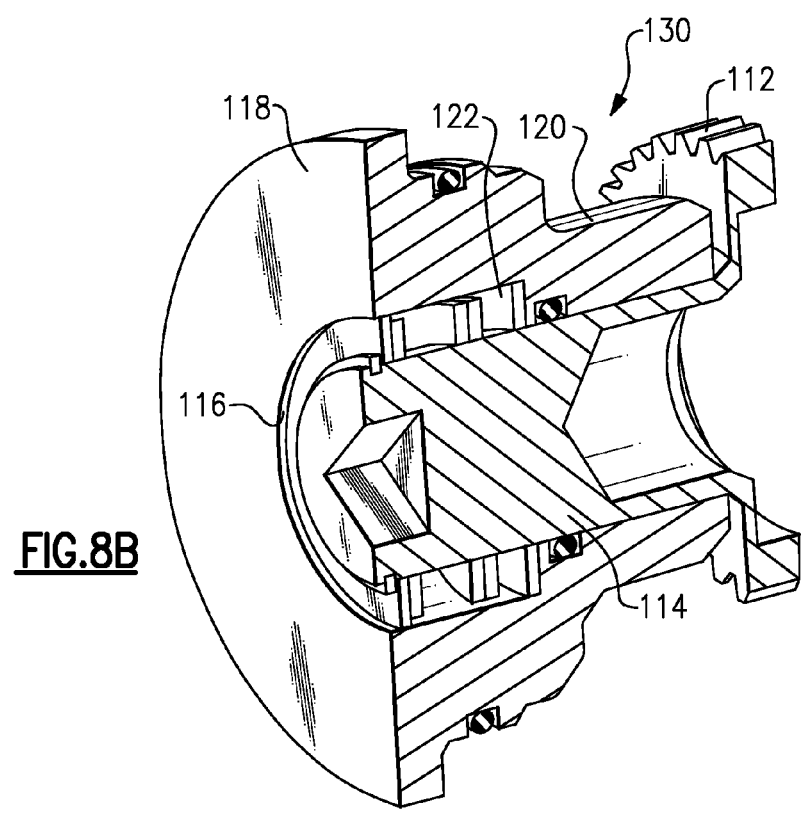
FIG. 8B shows yet another embodiment.

This is generally shown in FIG. 8B, which does show another embodiment 130. The embodiment 130 is similar to the FIG. 8A embodiment, but does not include the lube passages. As is clear, an outer end 600 of shaft 114 is still received within the bore 116 in the illustrated retracted position. This feature is as mentioned above, that the shaft does not extend outwardly of the housing 118. Again, this provides valuable benefits when housing space outwardly of the housing 118 is at a premium.

As is also clear from the figures, the gear teeth 112 extend radially outwardly of the end of the inner end of the bore 116, such that they are radially larger than the bore.

The embodiments to this point have included second drive connections, or gear teeth, which essentially are spline drive connections with the first drive connection on the accessory shaft. The spline drive connections have the same number of teeth as the first drive connection.

FIG. 9 shows yet another embodiment 131, wherein the spline drive of the earlier embodiments is replaced by an internal gear drive 134. The internal gear drive 134 has fewer teeth than the first drive connection 136. The centerline of the drive shaft connected to the drive gear 134 has been offset relative to the shaft 38 to bring the smaller drive gear into engagement. Again, the housing 132 mounts the biased drive member for selectively moving the gear 134 into engagement.

FIG. 10 shows an embodiment 140, where an external gear drive 144 is provided with housing 142. Again, there are fewer gear teeth on the external gear drive 144, and they are engaged with gear teeth 146 on the outer surface of an accessory drive shaft 38.

Although embodiment of this invention have been disclosed, a worker of ordinary skill in this art would recognize that certain modifications would come within the scope of this invention. For that reason, the following claims should be studied to determine the true scope and content of this invention.

What is claimed is:

1. A gas turbine engine accessory box comprising:
    an accessory shaft for driving an accessory of the gas turbine engine, the accessory shaft to be connected to a main shaft in a gas turbine engine through a gear train;
    a first drive connection for driving said accessory shaft;
    a biased drive member including a second drive connection to be selectively brought into contact with said first drive connection to allow rotation of the main shaft, said biased drive member biasing said second drive connection out of contact with said first drive connection;
    said second drive connection includes gear teeth that are selectively brought into engagement with gear teeth on said first drive connection;
    said second drive connection including a shaft guided within a bore in a housing, with said gear teeth on said second drive connection being beyond an inner end of said bore, an outer end of said shaft not extending outwardly beyond an end face of said housing, and not outwardly of said bore, even in a retracted position at which said biased drive member biases said second drive connection away from said first drive connection;
    said gear teeth of the second drive connection extending radially outwardly of the inner end of the bore, and are radially larger than the bore; and
    wherein said gear teeth on said second drive connection include a spline drive having the same number of teeth as are on an internal surface of said first drive connection.

2. The gas turbine engine accessory box as set forth in claim 1, wherein said gear teeth on said second drive connection include a spline drive having the same number of teeth as are on an internal surface of said first drive connection..

3. The gas turbine engine accessory box as set forth in claim 1, wherein said biased drive member having a drive shaft that includes a bias member at an outer end, said bias member biasing said shaft and said second drive connection outwardly and away from said first drive connection.

4. The gas turbine engine accessory box as set forth in claim 3, wherein said bias member includes a spring washer.

5. The gas turbine engine accessory box as set forth in claim 1, wherein a dust cover is positioned outwardly of said biased drive member.

6. The gas turbine engine accessory box as set forth in claim 1, wherein a biased shaft carrying said second drive connection is provided with threads to allow the attachment of a retractor tool if said biased shaft becomes stuck in said first drive connection.

7. The gas turbine engine accessory box as set forth in claim 1, wherein a housing for said biased drive member includes a plurality of mounting holes such that an automated rotator can be mounted to said housing, with said automated rotator driving said first drive connection by biasing said second drive connection into contact, and then rotating said second drive connection.

8. The gas turbine engine accessory box as set forth in claim 1, wherein said biased drive member includes a movable shaft which carries said second drive connection and which is sealed within a housing for the rotator drive connection when said biased drive member has biased said shaft and said second drive connection out of contact with said first drive connection.

9. The gas turbine engine accessory box as set forth in claim 1, wherein a plug drive surface is provided for receiving a rotator drive to drive said biased drive member to rotate said second drive connection, and hence said first drive connection.

10. A gas turbine engine accessory box comprising:
an accessory drive shaft to be selectively driven by a main drive shaft in a gas turbine engine, and said accessory drive shaft driving a plurality of accessory shafts, with at least one of said accessory shafts being provided with a borescopic rotator connection, said borescopic rotator connection including a first drive connection for driving said at least one accessory shaft;
a biased drive member including a second drive connection to be selectively brought into contact with said first drive connection to allow rotation of the main drive shaft, said biased drive member biasing said second drive connection out of contact with said first drive connection;
said biased drive member having a shaft that includes a bias member at an outer end, said bias member biasing said shaft and said second drive connection outwardly and away from said first drive connection;
said second drive connection includes gear teeth that are selectively brought into engagement with gear teeth on said first drive connection;
said second drive connection including a shaft guided within a bore in a housing, with said gear teeth on said second drive connection being beyond an inner end of said bore, an outer end of said shaft not extending outwardly beyond an end face of said housing, and not outwardly of said bore, even in a retracted position at which said biased drive member biases said second drive connection away from said first drive connection:
said gear teeth of the second drive connection extending radially outwardly of the inner end of the bore, and are radially larger than the bore; and
wherein said gear teeth on said second drive connection include a spline drive having the same number of teeth as are on an internal surface of said first drive connection.

11. The gas turbine engine accessory box as set forth in claim 10, wherein an accessory gear train is driven by the main drive shaft of the gas turbine engine, and will extend away from the main drive to in turn drive said accessory drive shaft, and a housing receiving said biased drive member such that said biased drive member can be removed from said housing to allow removal of said accessory gear train.

12. The gas turbine engine accessory box as set forth in claim 10, wherein said biased drive member includes a movable shaft which carries said second drive connection and which is sealed within a housing for the rotator drive connection when said biased drive member has biased said shaft and said second drive connection out of contact with said first drive connection.

13. The gas turbine engine accessory box as set forth in claim 10, wherein a plug drive surface is provided for receiving a rotator drive to drive said biased drive member to rotate said second drive connection, and hence said first drive connection.

* * * * *